(12) United States Patent
Abiko

(10) Patent No.: US 9,317,733 B2
(45) Date of Patent: Apr. 19, 2016

(54) BIOMETRIC INFORMATION READING DEVICE AND BIOMETRIC INFORMATION READING METHOD

(75) Inventor: Yukihiro Abiko, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 632 days.

(21) Appl. No.: 12/474,397

(22) Filed: May 29, 2009

(65) Prior Publication Data

US 2010/0002914 A1 Jan. 7, 2010

(30) Foreign Application Priority Data

Jul. 4, 2008 (JP) ................................ 2008-176371

(51) Int. Cl.
 *G06K 9/00* (2006.01)
(52) U.S. Cl.
 CPC .................................. *G06K 9/00026* (2013.01)
(58) Field of Classification Search
 None
 See application file for complete search history.

(56) References Cited

U.S. PATENT DOCUMENTS

| | | | |
|---|---|---|---|
| 5,721,624 A * | 2/1998 | Kumashiro et al. | 358/450 |
| 6,031,942 A * | 2/2000 | Nakayama | G06K 9/00087 382/124 |
| 6,185,317 B1 * | 2/2001 | Nakayama | G06K 9/00087 382/124 |
| 6,317,508 B1 | 11/2001 | Kramer et al. | |
| 6,459,804 B2 | 10/2002 | Mainguet | |
| 7,197,168 B2 | 3/2007 | Russo | |
| 7,627,150 B2 * | 12/2009 | Abiko | G06K 9/00026 345/629 |

(Continued)

FOREIGN PATENT DOCUMENTS

| | | |
|---|---|---|
| JP | 10-91769 | 4/1998 |
| JP | 11-253428 | 9/1999 |

(Continued)

OTHER PUBLICATIONS

European Search Report dated Jun. 28, 2013, from corresponding European Application No. 09007528.4-1901.

(Continued)

*Primary Examiner* — Aaron W Carter
(74) *Attorney, Agent, or Firm* — Katten Muchin Rosenman LLP

(57) ABSTRACT

A biometric information reading device includes an image capturing unit that sequentially captures a plurality of partial images about biometric information, an image feature extracting unit that extracts an image feature from each of the partial images and a position of the image feature, a matching relative position detecting unit that determines whether a relative distance between two successive partial images among the partial images is equal to or smaller than a threshold value, based on the image feature of an overlapping region between the two successive partial images, and a partial image output determining unit that determines to output at least two successive partial images as one set, determines not to output a partial image that is input after the partial images as the one set when the matching relative position detecting unit determines that a relative distance of the partial image from one of the partial images as the one set is equal to or smaller than the threshold value, and determines to output at least two successive partial images as another set including a partial image that is input after the partial images as the one set when the matching relative position detecting unit determines that a relative distance of the partial image from one of the partial images as the one set is not equal to or smaller than the threshold value.

15 Claims, 20 Drawing Sheets

(56) References Cited

U.S. PATENT DOCUMENTS

| | | | |
|---|---|---|---|
| 2002/0164056 A1* | 11/2002 | Funada | G06K 9/00067 382/124 |
| 2003/0123714 A1* | 7/2003 | O'Gorman | G06K 9/00899 382/124 |
| 2003/0123715 A1* | 7/2003 | Uchida | 382/124 |
| 2003/0161510 A1 | 8/2003 | Fujii | |
| 2004/0114784 A1* | 6/2004 | Fujii | 382/124 |
| 2004/0228508 A1* | 11/2004 | Shigeta | G06K 9/00026 382/124 |
| 2005/0100200 A1* | 5/2005 | Abiko et al. | 382/124 |
| 2005/0180616 A1* | 8/2005 | Ikeda | G06K 9/00026 382/124 |
| 2006/0078176 A1* | 4/2006 | Abiko et al. | 382/124 |
| 2006/0210170 A1* | 9/2006 | Yumoto et al. | 382/219 |
| 2006/0239514 A1 | 10/2006 | Watanabe et al. | |
| 2007/0165913 A1 | 7/2007 | Tyan et al. | |
| 2007/0177767 A1* | 8/2007 | Miura | G06K 9/00 382/115 |
| 2008/0205714 A1* | 8/2008 | Benkley | G06F 3/03547 382/126 |
| 2008/0317290 A1* | 12/2008 | Tazoe | G06K 9/00026 382/107 |
| 2009/0074263 A1* | 3/2009 | Higuchi | A63B 5/1172 382/126 |
| 2010/0002914 A1* | 1/2010 | Abiko | G06K 9/00026 382/124 |
| 2010/0061602 A1* | 3/2010 | Yamada | G06K 9/00067 382/124 |

FOREIGN PATENT DOCUMENTS

| | | |
|---|---|---|
| JP | 2002-216116 | 8/2002 |
| JP | 2003-208620 | 7/2003 |
| JP | 2003-271964 | 9/2003 |
| JP | 2006-260359 | 9/2006 |
| WO | 2004/026139 | 4/2004 |

OTHER PUBLICATIONS

Lisa Gottesfeld Brown. "A Survey of Image Registration Techniques" ACM Computing Surveys, vol. 24, Dec. 1, 1992, pp. 325-376.

* cited by examiner

FIG. 4

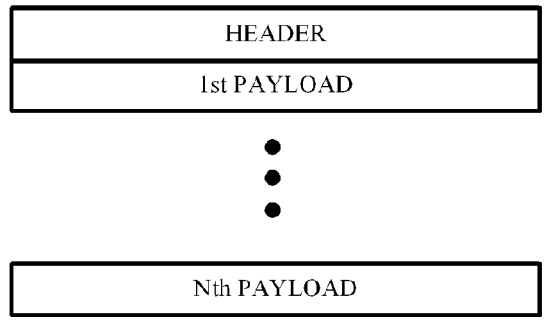

| HEADER | IDENTIFIER | SYMBOL FOR IDENTIFYING DATA TYPE |
|---|---|---|
| | IMAGE SIZE (HORIZONTAL) | NUMBER OF PIXELS IN PARTIAL IMAGE IN HORIZONTAL DIRECTION |
| | IMAGE SIZE (VERTICAL) | NUMBER OF PIXELS IN PARTIAL IMAGE IN VERTICAL DIRECTION |
| | NUMBER OF PAYLOADS | THIS MAY BE OMITTED IF DATA IS OUTPUT WHILE BIOMETRIC INFORMATION IS BEING READ. |
| | MAXIMUM NUMBER OF SHEETS | NUMBER OF PAYLOADS |
| | PAYLOAD SIZE | DATA SIZE OF PAYLOADS |
| PAYLOAD | TERMINATION FLAG | NONTERMINAL WHEN FLAG IS "0", TERMINAL WHEN FLAG IS "1"<br><br>THIS MAY BE OMITTED IF THE NUMBER OF PAYLOAD IS FIXED. |
| | COUNTER | COUNTER VALUE INDICATING PARTIAL IMAGE CAPTURING ORDER<br><br>THIS DOES NOT GENERATE SEQUENTIAL NUMBERS IF DISCARDING IS PERFORMED |
| | AUXILIARY DATA FLAG | NON-AUXILIARY DATA WHEN FLAG IS "0", AUXILIARY DATA |
| | TIME STAMP | READING START TIME AND READING END TIME<br><br>THIS MAY INDICATE THE READING TIME ELAPSED BETWEEN THE START OF READING AND THE END OF READING.<br><br>THE READING END TIME MAY BE OMITTED IF THERE IS NOT A DELAY BETWEEN ANY TWO SUCCESSIVE PARTIAL IMAGES |
| | DATA | PARTIAL IMAGES OR AUXILIARY DATA |

BIOMETRIC INFORMATION READING DEVICE AND BIOMETRIC INFORMATION READING METHOD

CROSS-REFERENCE TO RELATED APPLICATION

This application is based upon and claims the benefit of priority of the prior Japanese Patent Application No. 2008-176371, filed on Jul. 4, 2008, the entire contents of which are incorporated herein by reference.

FIELD

The present invention relates to a technique for reading biometric information.

BACKGROUND

A fingerprint sensor that captures fingerprint images from persons to be authenticated normally has a sensor surface that is greater than finger. In recent years, however, sensor surfaces are smaller than finger, so that fingerprint sensors can be mounted on small-sized information devices such as portable telephone devices and PDAs (Personal Digital Assistants). In such a case, partial images that are successively captured through a sensor surface are combined to form an image of an entire fingerprint.

Japanese Patent Application Publication Nos. 10-091769, 11-253428 and 2003-208620 disclose sweep-type fingerprint sensors as fingerprint sensors of the above type. In a sweep-type fingerprint sensor, there is friction between the finger skin and the sensor surface of the fingerprint sensor. Therefore, the finger is stuck on the sensor surface of the fingerprint sensor, and makes a relative movement when released.

Japanese Patent Application Publication Nos. 2003-271964, 2002-216116 and 2006-260359 disclose techniques for correcting image distortions caused by such movements. International Publication No. WO 2004/026139 discloses a technique for correcting partial images having distortions caused by delays in detections depending on the scanning method of the image capturing device, with the use of the relative positions of the partial images and the time information.

In those conventional techniques, changes caused in relative positions in a very short period of time are ignored. In cases where a discarding process is carried out on the side of the fingerprint sensor device, small errors are allowed so that the discarding is exhaustively performed, regardless of the influence of noise or the like. Here, the discarding process is a process of reducing the data amount by stopping output of some partial images among successive partial images.

However, there is a problem with the simple discarding process disclosed in conventional techniques. As described above, when there is friction between the skin of finger and the sensor surface of the fingerprint sensor, the finger is stuck on the sensor surface of the fingerprint sensor, and makes a relative movement when released. When such intermittent relative movements are made, the relative speed of the finger skin on the sensor surface varies in a very short period of time. As a result, some of the fingerprint information might be lost by the discarding. This situation will be hereinafter referred to as excess discarding.

When there is excess discarding, a region similar to some other region might not be detected from a region where partial images overlap with each other. In such a case, the frequency at which the person to be authenticated is rejected or a third party is accepted becomes higher. At the same time, due to the information loss caused by the excess discarding of partial images, there is the problem that changes caused in relative positions within a very short period of time cannot be detected with accuracy.

As described above, when there are rapid changes in a very short period of time, the distortion sizes vary in the partial image plane. In other words, due to the changes caused in relative position within a very short period of time, the distortions in the partial image plane become uneven. Where there are uneven distortions, regions similar to other regions are not detected, and the frequency at which the person to be authenticated is rejected or a third party is accepted becomes higher.

SUMMARY

According to an aspect of the present invention, there is provided a biometric information reading device including: an image capturing unit that sequentially captures a plurality of partial images about biometric information; an image feature extracting unit that extracts an image feature from each of the partial images and a position of the image feature; a matching relative position detecting unit that determines whether a relative distance between two successive partial images among the partial images is equal to or smaller than a threshold value, based on the image feature of an overlapping region between the two successive partial images; and a partial image output determining unit that determines to output at least two successive partial images as one set, determines not to output a partial image that is input after the partial images as the one set when the matching relative position detecting unit determines that a relative distance of the partial image from one of the partial images as the one set is equal to or smaller than the threshold value, and determines to output at least two successive partial images as another set including a partial image that is input after the partial images as the one set when the matching relative position detecting unit determines that a relative distance of the partial image from one of the partial images as the one set is not equal to or smaller than the threshold value.

With the use of a biometric information reading device, a biometric information reading method, and a biometric information reading program disclosed in this specification, it is possible to prevent excess discarding when rapid changes are caused in relative positions in a very short period of time.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 illustrates an example of a payload;

DESCRIPTION OF EMBODIMENTS

The following is a description of embodiments of the present invention, with reference to the accompanying drawings.

[First Embodiment]

Figure 1:
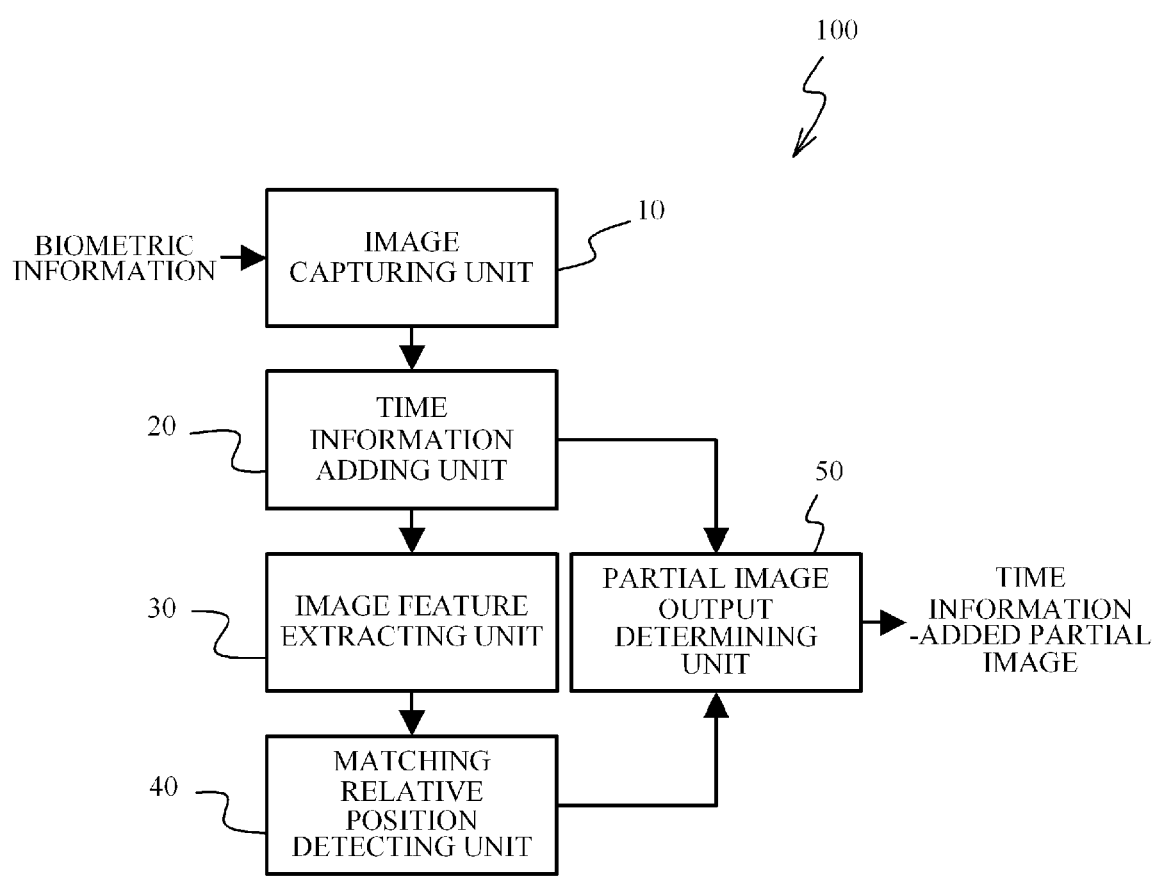
FIG. 1 is a block diagram illustrating the functional structure of a biometric information reading device in accordance with a first embodiment of the present invention.

FIG. 1 is a block diagram illustrating the functional structure of a biometric information reading device 100 in accordance with a first embodiment of the present invention. As depicted in FIG. 1, the biometric information reading device 100 includes an image capturing unit 10, a time information adding unit 20, an image feature extracting unit 30, a matching relative position detecting unit 40, and a partial image output determining unit 50.

The image capturing unit 10 is a sensor that captures an image of a living subject. In this embodiment, the image capturing unit 10 is a sweep-type capacitance fingerprint sensor. However, the technique disclosed in the present invention does not depend on its reading method, and therefore, the image capturing unit 10 is not limited to the sweep-type capacitance fingerprint sensor. The image capturing unit 10 may be any of sweep-type fingerprint sensors of various methods, such as a sweep-type weak-field fingerprint sensor, a sweep-type heat-sensitive fingerprint sensor, and a sweep-type optical fingerprint sensor.

The biometric information reading device 100 includes a CPU (Central Processing Unit) and a memory unit formed with a volatile memory and/or a nonvolatile memory. The CPU executes a biometric information reading program for implementing a biometric information reading method, so as to realize the time information adding unit 20, the image feature extracting unit 30, the matching relative position detecting unit 40, and the partial image output determining unit 50. Each of the time information adding unit 20, the image feature extracting unit 30, the matching relative position detecting unit 40, and the partial image output determining unit 50 may be realized by special-purpose hardware, or may be realized by a computer.

Figure 2A:
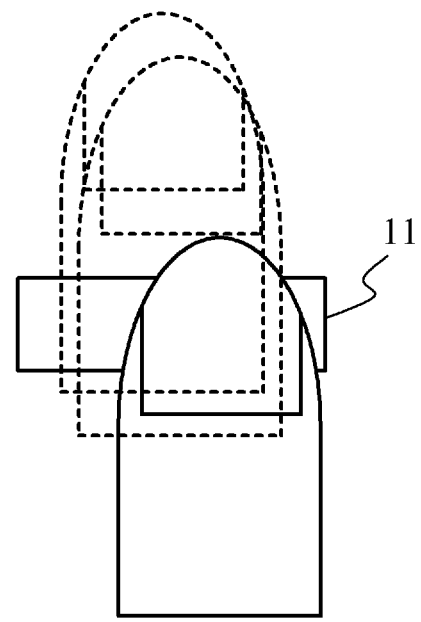
FIGS. 2A and 2B illustrate the image capturing unit of the first embodiment.

The image capturing unit 10 visualizes the biometric information about a person to be authenticated, and successively captures partial images corresponding to the biometric information. More specifically, as depicted in FIG. 2A, the image capturing unit 10 moves a finger of the person to be authenticated on a sensor surface 11, while the finger is kept in contact with the sensor surface 11. The image capturing unit 10 then successively captures partial images of the fingerprint from the finger.

Figure 2B:
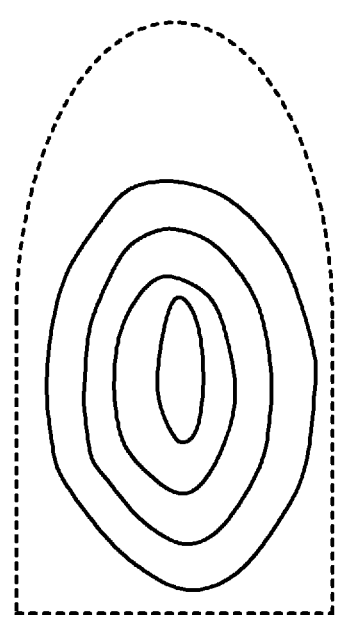

As depicted in FIG. 2B, the fingerprint is formed in the outer surface of the skin of the person to be authenticated, and has convex lines in contact with the sensor surface 11 and concave lines not in contact with the sensor surface 11. Taking advantage of the fact that the detection sensitivity differs between the convex line portions in contact with the sensor surface 11 and the concave line portions not in contact with the sensor surface 11, the image capturing unit 10 captures the partial images of the fingerprint as multivalue images. The multivalue images have luminance that varies with the distance from the sensor. Normally, the convex line portions closer to the sensor are displayed with low luminance, and the concave line portions farther away from the sensor are displayed with high luminance.

When authentication is performed with a fingerprint, the person to be authenticated moves a finger from its base to its tip, from its tip to its base, or from its right side to its left side, while keeping the finger in contact with the sensor surface 11. In a case where a mechanism for moving the image capturing unit 10 with respect to a finger is provided, however, the person to be authenticated does not need to move the finger. In this embodiment, a case where the person to be authenticated moves a finger from its base to its tip in a sweeping manner is described.

The time information adding unit 20 is used to add a time seal to each of the partial images successively captured by the image capturing unit 10. The memory unit stores the partial images successively captured by the image capturing unit 10, and features and relative positions obtained by a function of the CPU.

The image feature extracting unit 30 extracts the features of each partial image and the locations of the features from the partial images captured by the image capturing unit 10. The image feature extracting unit 30 may extract both the foreground of each partial image and the edge of the foreground, or may extract, as the features, the endpoint and branching point of a pattern obtained by thinning the foreground of each partial image.

The matching relative position detecting unit 40 determines whether the relative positions of two successive partial images of the captured partial images are the same. First, based on the features existing in the overlapping region between two successive images, the matching relative position detecting unit 40 determines the relative movement between the two partial images. If the relative movement is equal to or smaller than a threshold value, the matching relative position detecting unit 40 determines that the relative positions of the two partial images are the same. The partial image output determining unit 50 determines which partial images among the successive partial images are not to be output and are to be eliminated. This operation will be described later in detail.

Figure 3:
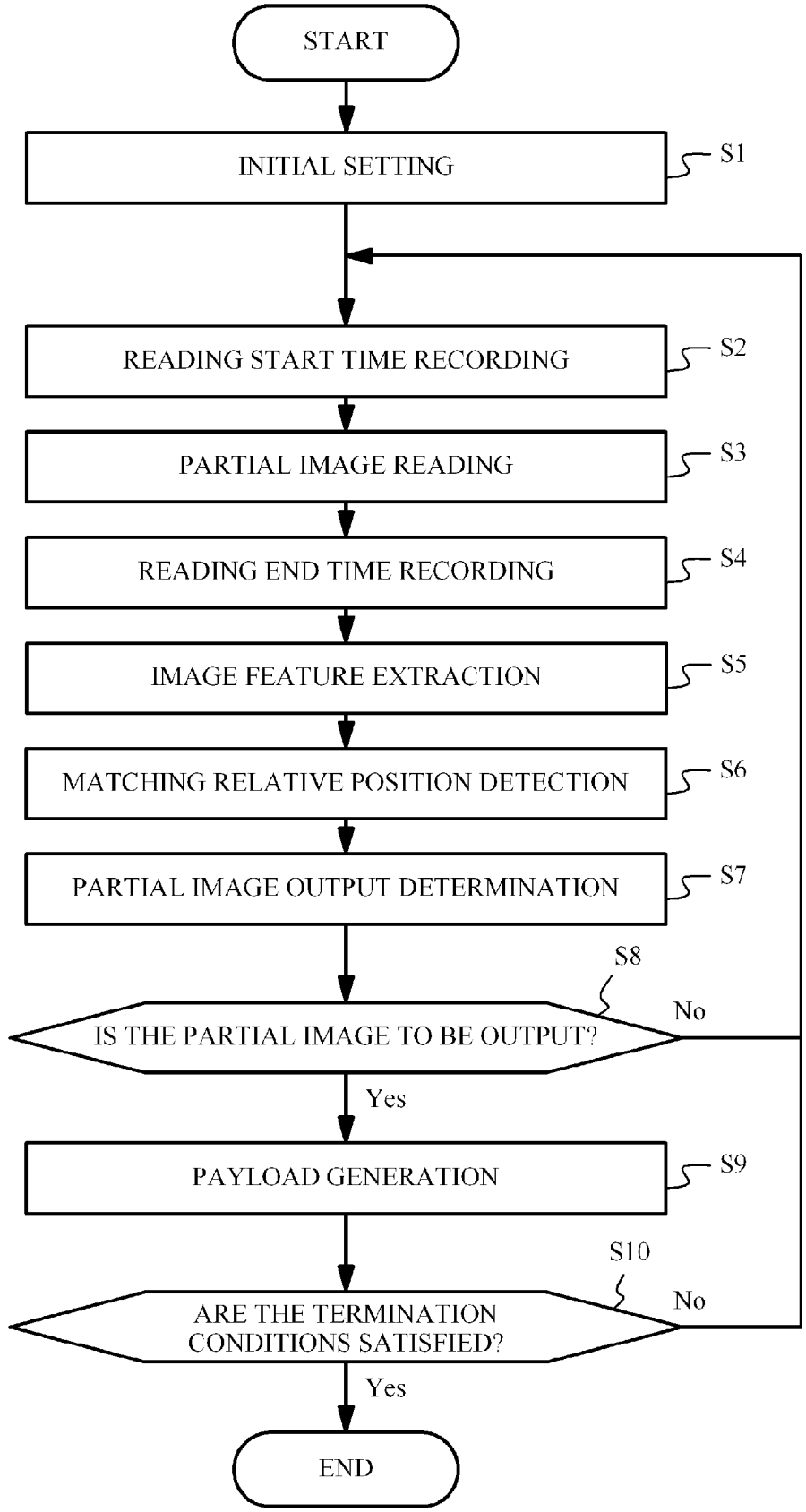
FIG. 3 is a flowchart illustrating an example of a biometric information reading operation.

FIG. 3 illustrates an example of a flowchart of a biometric information reading operation. As depicted in FIG. 3, the time information adding unit 20, the image feature extracting unit 30, the matching relative position detecting unit 40, and the partial image output determining unit 50 are initialized (step S1).

The time information adding unit 20 records the reading start time as the time information on the memory unit (step S2). The image capturing unit 10 reads partial images (step S3). The time information adding unit 20 then records the reading end time as the time information on the memory unit (step S4). The image feature extracting unit 30 extracts image features (step S5).

The matching relative position detecting unit 40 determines whether each two successive ones of the partial images have the same relative positions (step S6). The partial image output determining unit 50 then performs the later described partial image output determining operation (step S7). The partial image output determining unit 50 then determines whether the partial images can be output (step S8).

If the output of the partial images is determined not to be allowable in step S8, the procedure of step S2 is again carried out. If the output of the partial images is determined to be allowable in step S8, the partial image output determining unit 50 generates a payload (step S9). FIG. 4 illustrates an example of the payload.

The partial image output determining unit 50 next determines whether termination conditions are satisfied (step S10). If the termination conditions are determined to be satisfied in step S10, the operation described in the flowchart comes to an end. If the terminal conditions are determined not to be satisfied in step S1, the procedure of step S2 is again carried out.

The partial image output determining operation of step S7 depicted in FIG. 3 is now described. To realize the operation to eliminate redundant partial images, one of any two partial images located at the same relative positions should not be output but should be discarded. However, due to various factors, partial images are not exactly the same. Therefore, to detect matching relative positions, it is necessary to allow some errors. Examples of the causes of errors include noises in the partial images, distortions of the biometric information, and slight displacement in relative positions.

If there is a relative movement between a finger and the image capturing unit 10, the relative movement might be considered to be none, since some errors are allowed. In such a case, the partial images are discarded, and the information about the partial images is lost. For example, such a problem is caused in a case where a partial image is input the instant the positional relationship between the finger and the image capturing unit 10 starts changing rapidly, and the partial image is discarded.

More specifically, with $P_n$ representing a partial image that is the nth input partial image, $P_{n+1}$ is discarded when the relative positions of $P_n$ and $P_{n+1}$ are determined to be the same. However, in a case where the positional relationship between $P_n$ and $P_{n+2}$ cannot be detected even though the positional relationship between $P_{n+1}$ and $P_{n+2}$ is detected, the corresponding biometric information is lost if $P_{n+1}$ is discarded.

To counter this problem, T (T being 2 or greater) successively-input partial images are output as one set. Accordingly, $P_{n+1}$, which is input when the positional relationship starts changing rapidly, can be prevented from being discarded. In this manner, excessive elimination can be prevented when the positional relationship changes rapidly in a very short period of time.

Figure 5:
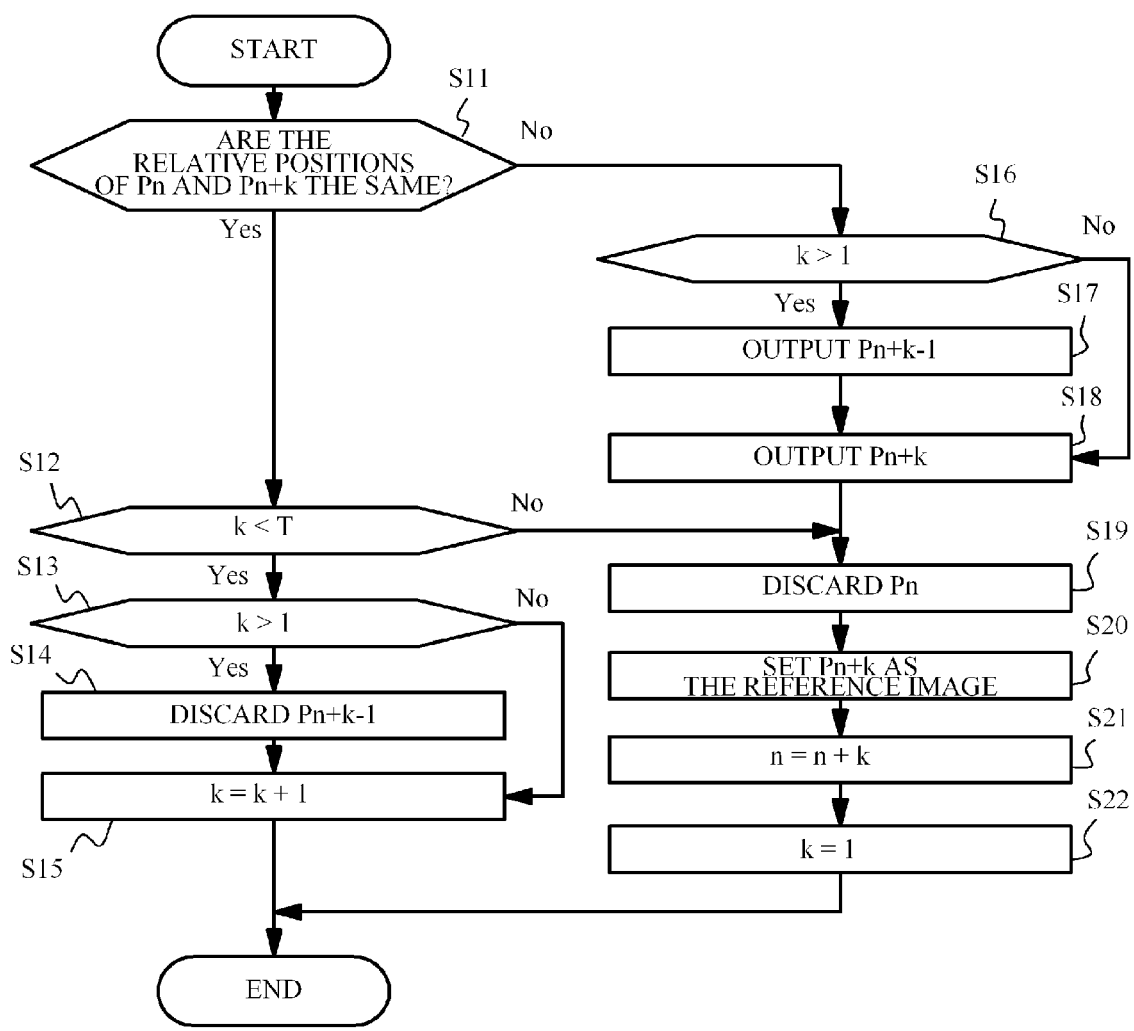
FIG. 5 is a flowchart illustrating an example of a partial image output determining operation.

FIG. 5 is a flowchart illustrating an example of the partial image output determining operation. As depicted in FIG. 5, based on the result of the determination by the matching relative position detecting unit 40, the partial image output determining unit 50 determines whether the relative positions of the reference image $P_n$ and an input image $P_{n+k}$ are the same (step S11). Here, $P_n$ is the nth input partial image, k represents a counter that has 1 as the initial value, and $P_{n+k}$ is the (n+k)th input partial image.

If the relative positions are determined to be the same in step S11, the partial image output determining unit 50 determines that k is smaller than T (step S12). If k is determined to be smaller than T in step S12, the partial image output determining unit 50 determines whether k is greater than 1 (step S13).

If k is determined to be greater than 1 in step S13, the partial image output determining unit 50 discards an input image $P_{n+k-1}$ (step S14). The partial image output determining unit 50 next assigns (k+1) to k (step S15). The operation described in the flowchart then comes to an end. If k is not determined not to be greater than 1 in step S13, the partial image output determining unit 50 skips the procedure of step S14, and carries out the procedure of step S15.

If the relative positions are determined not to be the same in step S11, the partial image output determining unit 50 determines whether k is greater than 1 (step S16). If k is determined to be greater than 1 in step S16, the partial image output determining unit 50 determines that the input image $P_{n+k-1}$ is to be output (step S17). The partial image output determining unit 50 next determines that the input image $P_{n+k}$ is to be output (step S18). If k is determined not to be greater than 1 in step S16, the partial image output determining unit 50 skips the procedure of step S17, and carries out only the procedure of step S18.

The partial image output determining unit 50 then discards the reference image $P_n$ (step S19). The partial image output determining unit 50 next sets the input image $P_{n+k}$ as the reference image (step S20). The partial image output determining unit 50 then assigns (n+k) to n (step S21). The partial image output determining unit 50 resets the counter k to 1 (step S22). The operation described in the flowchart then comes to an end. If k is determined not to be smaller than T in step S12, the partial image output determining unit 50 carries out the procedure of step S19.

According to the flowchart depicted in FIG. 5, if the relative position of the input image $P_{n+k}$ is not the same as the reference image $P_n$, not only the input image $P_{n-k}$ but also the input image $P_{n+k-1}$ is output, so that at least two partial images can be output as one set.

When the relative positions of output partial images are detected, it is possible to accurately detect a distortion amount from the input image $P_{n+k-1}$. This is because the distortion detection accuracy becomes lower, as some partial images are discarded.

Figure 6:
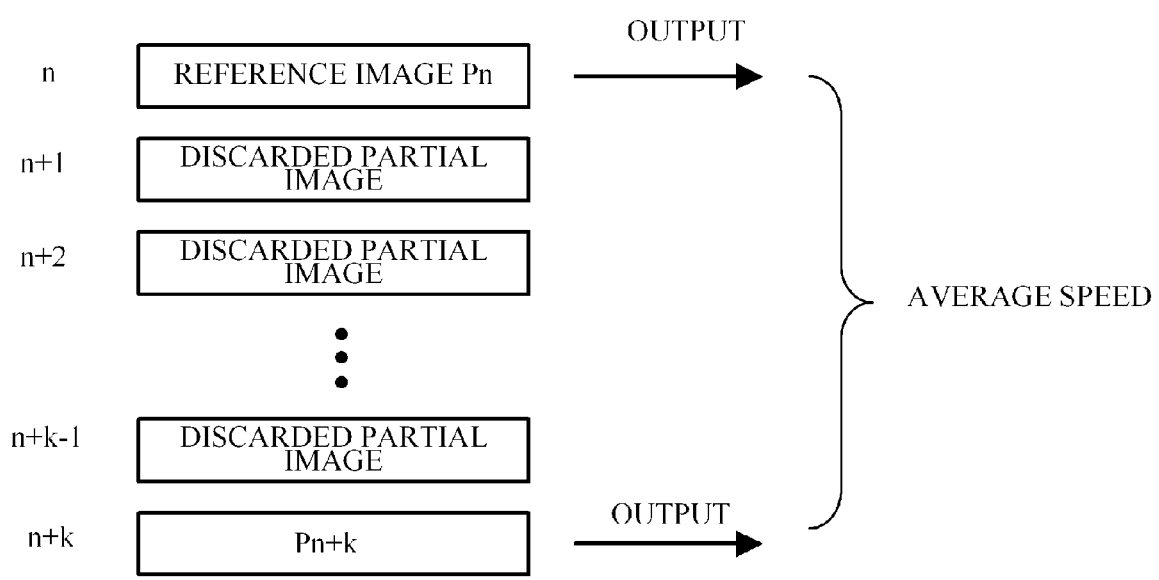
FIG. 6 illustrates instantaneous speed and average speed.

More specifically, a distortion amount is determined by the relative speed between the living subject and the biometric information capturing unit at the moment when a partial image is captured. The relative speed calculated from partial images that are output before and after a partial image is output exhibits an average value. Accordingly, there is a difference between the instantaneous speed and the average speed, as depicted in FIG. 6. As a result, the distortion detection accuracy becomes lower.

Figure 7:
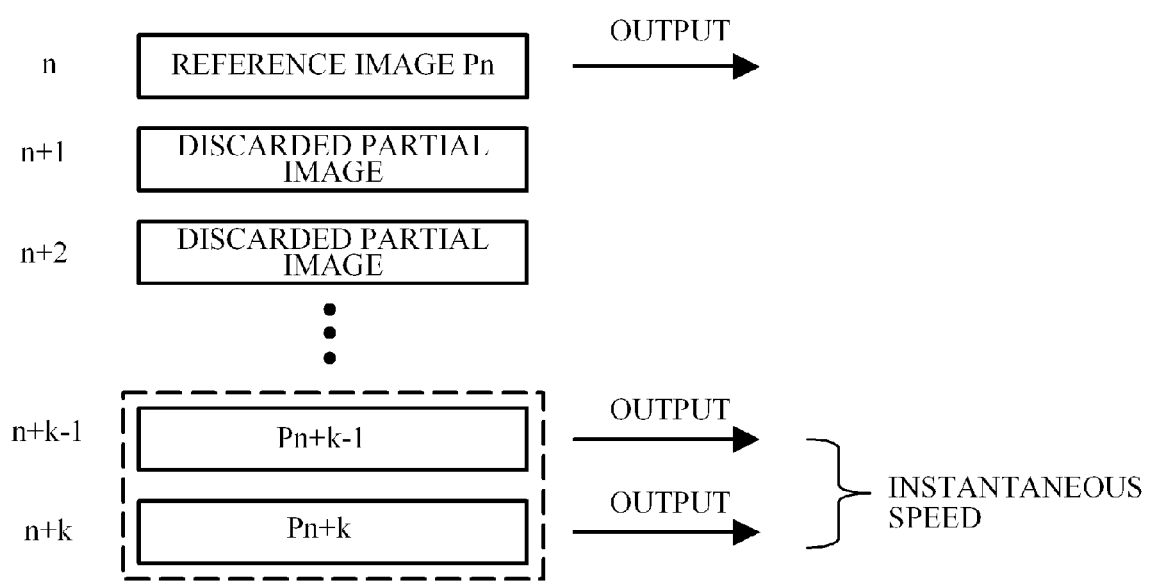
FIG. 7 illustrates instantaneous speed and average speed.

As depicted in FIG. 7, an instantaneous relative speed can be calculated by outputting the partial image $P_{n+k-1}$ and the previous partial image $P_{n+k-1}$ as a pair. Accordingly, while some partial images are being discarded, the degradation of the accuracy due to the discarding can be restrained, as depicted in FIG. 7.

In the flowchart depicted in FIG. 5, two partial images are successively output. However, three partial images $P_{n-k-1}$, $P_{n+k}$, and $P_{n+k+1}$ may be output in this order. In such a case, the instantaneous speed may be determined by either one or both of the positional relationship between the partial images $P_{n+k-1}$ and $P_{n+k}$ and the positional relationship between the partial images $P_{n+k}$ and $P_{n-k+1}$.

If there is a delay in successively reading partial images by the scanning line, the instantaneous speed varies while reading one partial image. Both of the positional relationship between the partial images $P_{n+k-1}$ and $P_{n+k}$ and the positional relationship between the partial images $P_{n+k}$ and $P_{n+k+1}$ are used as described above, so that the instantaneous speed can be locally predicted. To minimize the process, the higher one of the two instantaneous speeds should be applied to the instantaneous speed of the partial image $P_n$.

In the flowchart depicted in FIG. 5, if two relative positions are determined to be the same, the input image $P_{n+1}$ is not immediately set as the reference image $P_n$, but T or more partial images are left. If T is 1, there are no left partial images. When there is not a left partial image, the relative positions of the partial images $P_n$ and $P_{n+1}$ that are successively input are considered to be the same, even if there is a small relative movement between the living subject and the biometric information capturing unit. Therefore, there is a possibility that a partial image to be output is inadvertently discarded. However, with T being 2 or greater, inadvertent discarding of a partial image to be output can be prevented.

For example, there is a case where the relative positions of the reference image $P_n$ and the input image $P_{n+1}$ are considered to be the same, and the relative positions of the input images $P_{n+1}$ and $P_{n+2}$ are also considered to be the same with $P_{n+1}$ being the reference image. In this case, a difference might be detected between the relative positions of the reference image $P_n$ and the input image $P_{n+2}$. If "1" is set to T, the input images $P_{n-1}$ and $P_{n+2}$ are to be discarded. However, if "2" is set to T, the input image $P_{n+1}$ is not to be discarded. Accordingly, information loss due to discarding can be prevented.

Among the captured partial images, an upper limit may be set on the number of successive partial images not to be output through the discarding. For example, in a case where the biometric information to be captured is a fingerprint, a portion partially having a simple stripe pattern might be input as a partial image. If the relative positions are considered to be the same, partial images of different parts of a living subject might be discarded. There is a risk that information is lost due to inadvertent discarding of partial images.

If successive partial images are allowed to be discarded, there is a high risk that information is inadvertently lost as described above. To counter this problem, a limit is set on the process of discarding of successive partial images, so that the risk of information loss can be lowered. In this case, a wide range of biometric information can be read without loss, while the data amount is restrained. In this manner, high-precision reference to feature information is made possible at the time of personal authentication. Thus, the reliability of personal authentication using biometric information can be made higher.

Figure 8:
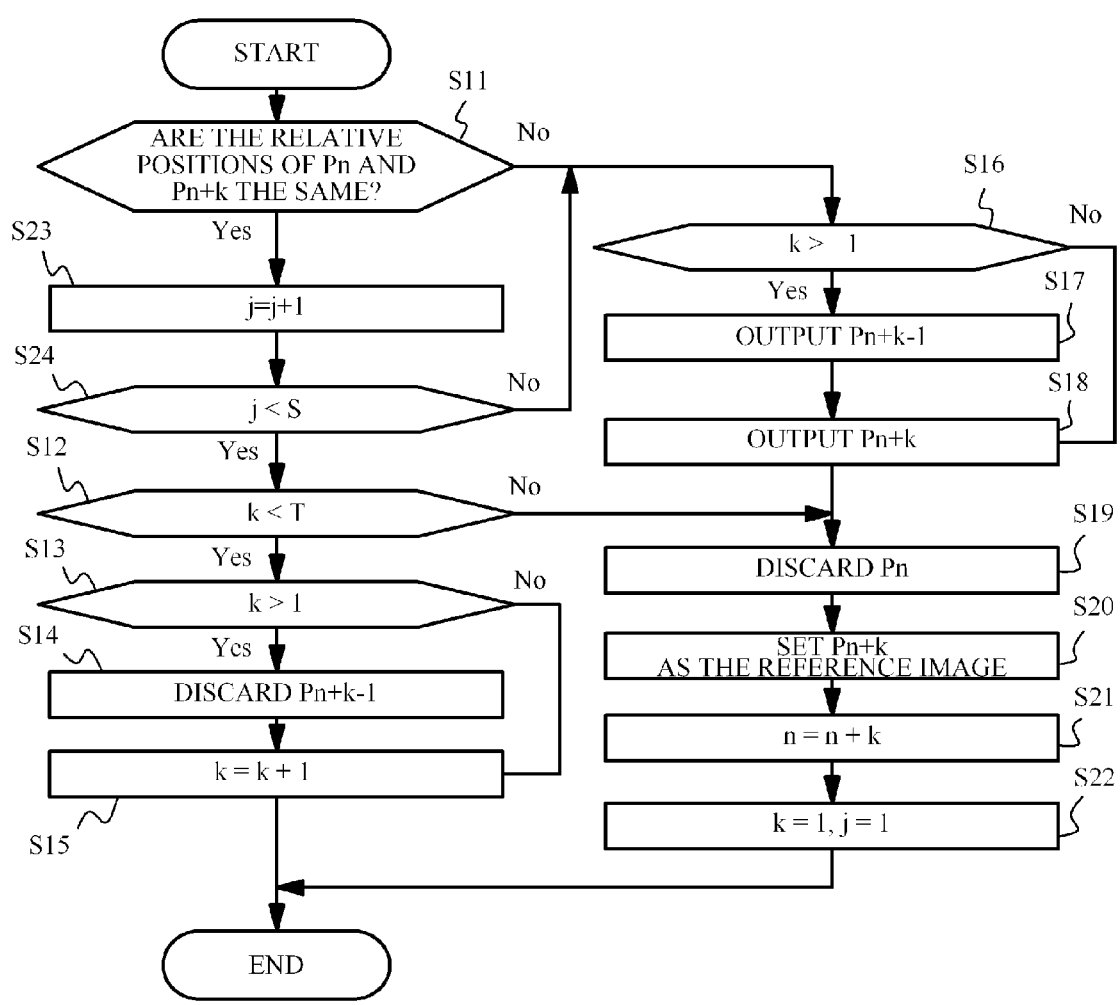
FIG. 8 is a flowchart illustrating an example of the operation to be performed in a case where a limit is set on the discarding process.

FIG. 8 illustrates a flowchart of an operation to be performed in this case. The flowchart depicted in FIG. 8 differs from the flowchart depicted in FIG. 5, in that the procedures of steps S23 and S24 are carried out between step S11 and step S12.

If the relative positions are determined to be the same in step S11 the partial image output determining unit 50 assigns (j+1) to the counter j (step S23). Here, the initial value of the counter j is "1". The partial image output determining unit 50 next determines whether j is smaller than S (step S24). Here, S represents the upper value that is set on the number of partial images to be successively discarded. If j is determined to be smaller than S in step S24, the procedure of step S12 is carried out. If j is determined not to be smaller than S in step S24, the procedure of step S16 is carried out.

According to this flowchart, an upper limit is set on the number of partial image to be successively discarded. In this manner, information loss can be prevented.

[Second Embodiment]

Figure 9:
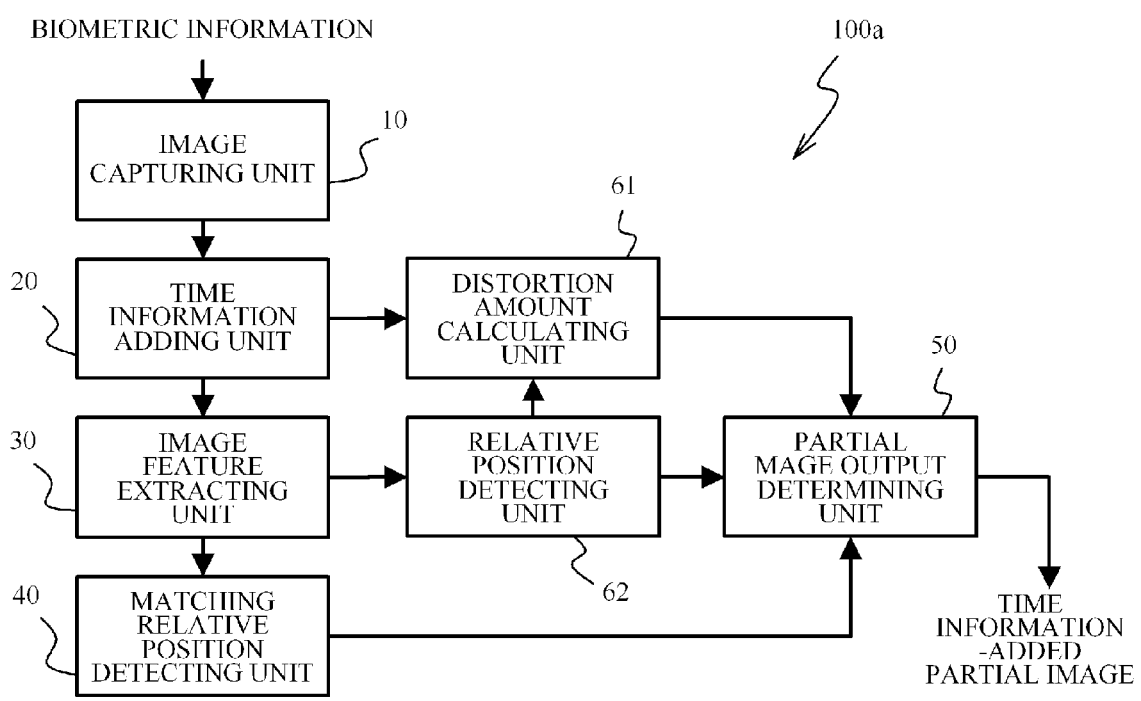
FIG. 9 is a block diagram illustrating the functional structure of a biometric information reading device in accordance with a second embodiment of the present invention.

FIG. 9 is a block diagram illustrating the functional structure of a biometric information reading device 100a in accordance with a second embodiment of the present invention. The biometric information reading device 100a differs from the biometric information reading device 100 depicted in FIG. 1, in further including a distortion calculating unit 61 and a relative position detecting unit 62. The CPU executes a biometric information reading program for implementing a biometric information reading method in accordance with the second embodiment, so as to realize the distortion calculating unit 61 and the relative position detecting unit 62. Each of the distortion calculating unit 61 and the relative position detecting unit 62 may be realized by special-purpose hardware or a computer.

Figure 10:
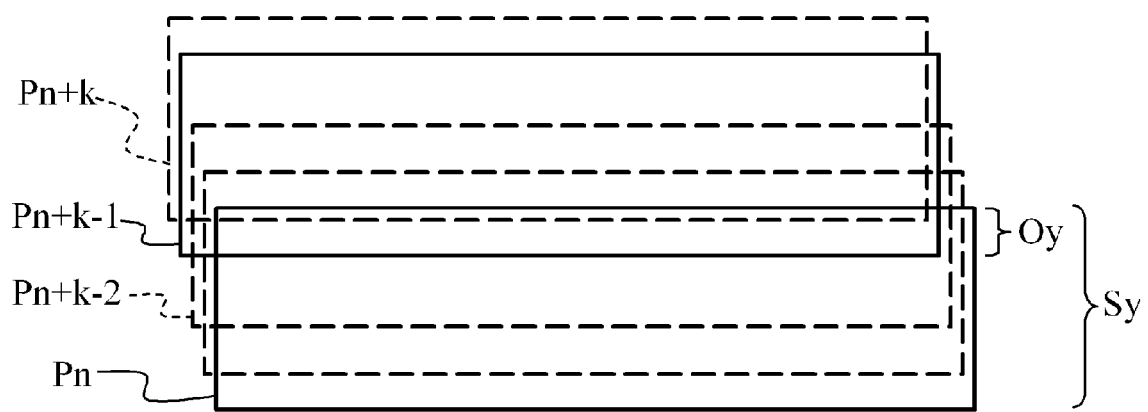
FIG. 10 illustrates a discarding process based on relative positions.

In this embodiment, redundant partial images are further discarded, based on relative positions. FIG. 10 illustrates the principles. As depicted in FIG. 10, there is a case where a position relative to a partial image having a height equivalent to Sy pixels can be detected when the height of an overlapping region is equivalent to or greater than Oy pixels. Here, the relative position of the $P_{n+m}$th input partial image with respect to the nth input partial image $P_n$ is a position equivalent to Sy–Oy or smaller. In this case, the number of partial images to be output can be reduced by discarding the partial images $P_{n+1}$ through $P_{n+m-1}$ as redundant information. Also, the memory amount, the processing time, and the likes required for processing the partial images after outputting can be reduced.

Here, to detect the partial image $P_{n+m}$ having a relative position of Sy–Oy or smaller with respect to the partial image $P_n$, the results of detection of the relative positions of the partial images that are input after the partial image $P_{n+1}$ is input. More specifically, in a case where the relative position of the partial image $P_{n+k}$ with respect to the partial image $P_n$ is equivalent to Sy–Oy or less, the partial image $P_{n|k-1}$ is discarded. In a case where the relative position of the partial $P_{n+k}$ with respect to the partial image $P_n$ is equivalent to Sy–Oy or greater, the partial image $P_{n+k-1}$ is not discarded but is output.

As described above, a distortion amount is determined by instantaneous speed. Therefore, the partial image $P_{n+k-2}$ as well as the partial image $P_{n+k-1}$ may be output. If there is not a difference between the instantaneous speed and the average speed at this point, it is not necessary to successively output two or more partial images. To discard redundant partial images more efficiently, two or more partial images may be successively output only when there is a difference between the distortion amount calculated from the instantaneous speed and the distortion amount calculated from the average speed.

Figure 11:
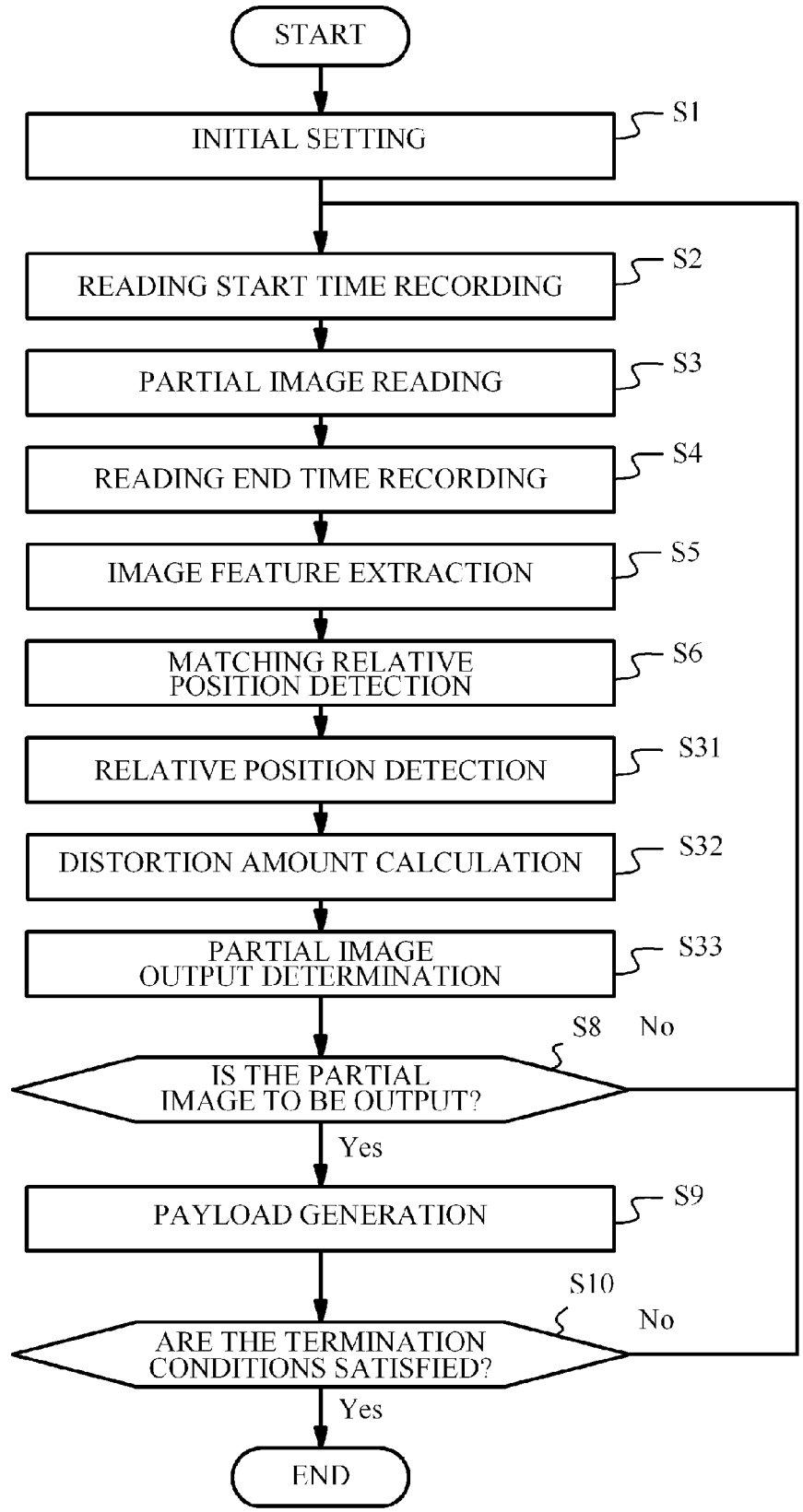
FIG. 11 is a flowchart illustrating an example of the operation to be performed in a case where redundant partial images are discarded based on relative positions.

FIG. 11 is a flowchart illustrating an example of the operation to be performed in a case where redundant partial images are discarded based on relative positions. The flowchart of FIG. 11 differs from the flowchart of FIG. 3, in that step S31 and step S32 are inserted between step S6 and step S7.

After the procedure of step S6 is carried out, the relative position detecting unit 62 detects the relative position of each partial image (step S31). The distortion calculating unit 61 then calculates the distortion amount of each partial image (step S32). In this case, the distortion amount can be calculated from the instantaneous speed of two successive partial images. In this embodiment, a partial image output determining operation is performed in step S7, according to the principles illustrated in FIG. 10. After that, the procedure of step S8 is carried out.

According to this flowchart, the partial images to be discarded can be determined, based on the distortion amounts calculated from the relative positions. Distortions that can be handled in this embodiment are not particularly specified, as long as they are geometric distortions. However, it is possible to cope with skew distortions, expansion and contraction distortions, and the likes. A skew distortion can be calculated based on a main scanning directional component relative to the movement direction of the living subject. An expansion or contraction distortion may be calculated based on a sub scanning directional component relative to the movement direction of the living subject.

[Third Embodiment]

Figure 12:
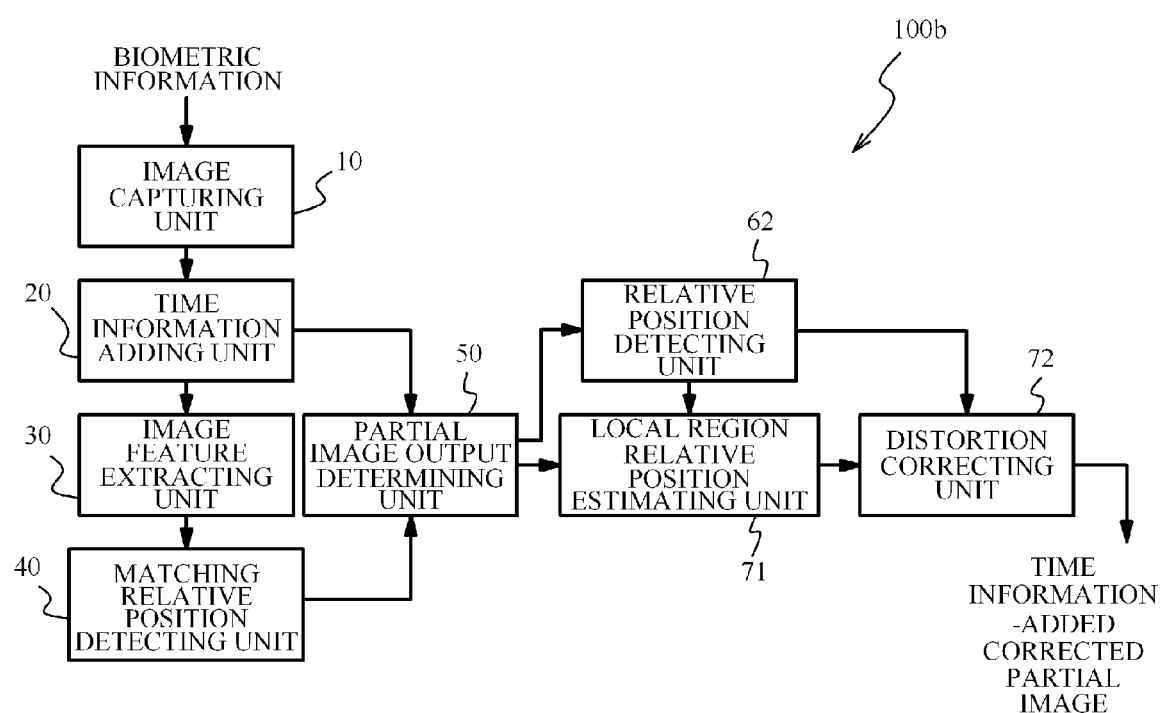
FIG. 12 is a block diagram illustrating the functional structure of a biometric information reading device in accordance with a third embodiment of the present invention.

FIG. 12 is a block diagram illustrating the functional structure of a biometric information reading device 100b in accordance with a third embodiment of the present invention. The biometric information reading device 100b differs from the biometric information reading device 100 depicted in FIG. 1, in further including a relative position detecting unit 62, a local region relative position estimating unit 71, and a distortion correcting unit 72.

The CPU executes a biometric information reading program for implementing a biometric information reading method in accordance with the third embodiment, so as to realize the relative position detecting unit 62, the local region relative position estimating unit 71, and the distortion correcting unit 72. Each of the relative position detecting unit 62, the local region relative position estimating unit 71, and the distortion correcting unit 72 may be realized by special-purpose hardware or a computer.

The local region relative position estimating unit 71 estimates the relative position of each local region, based on the relative position detected from an entire partial image and the relative positions of adjacent local regions. A local region is a part of the region in the plane of a partial image. Accordingly, each partial image is formed with local regions. The distortion correcting unit 72 performs distortion correction on each of the local regions formed in conformity with the scanning lines of each partial image.

If there is a delay in successively reading partial images by the scanning line, the instantaneous speed varies while reading one partial image. The relative positions detected from the partial images $P_{n|+k-1}$ and $P_{n|k}$ and the relative positions detected from the partial images $P_{n+k}$ and $P_{n+k+1}$ are used, so as to predict the local instantaneous speed. At the portion to be read first, the instantaneous speed calculated based on the relative positions detected from the partial images $P_{n+k-1}$ and $P_{n+k}$ is used. At the portion to be read last, the instantaneous speed calculated based on the relative positions detected from the partial images $P_{n+k}$ and $P_{n+k-1}$ is used. The intermediate speed between the two instantaneous speeds can be determined by performing linear interpolation on the two instantaneous speeds. Each scanning line of the biometric information capturing unit is a unit of a local region.

Figure 13:
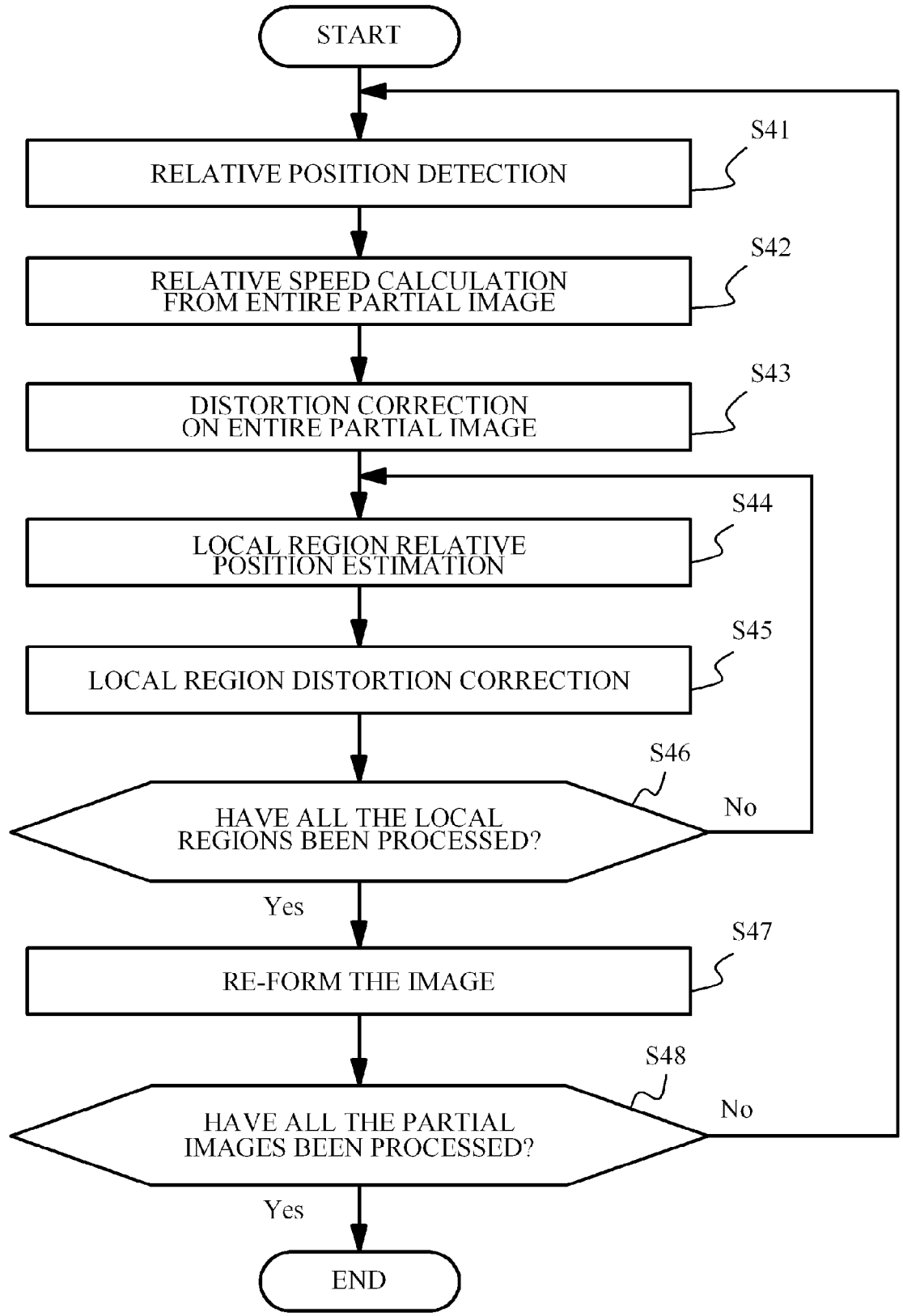
FIG. 13 is a flowchart illustrating an example of the operation to be performed in a case where the distortion amounts in local regions are corrected.

FIG. 13 is a flowchart illustrating an example of the operation to be performed in a case where distortions in local regions are corrected. As depicted in FIG. 13, the relative position detecting unit 62 detects the relative position of a partial image (step S41). The relative position detecting unit 62 then calculates the relative speed from the entire partial image (step S42). The distortion correcting unit 72 performs distortion correction on the entire partial image (step S43).

The local region relative position estimating unit 71 estimates a local region relative position (step S44). The distortion correcting unit 72 then corrects the local region distortion (step S45). The distortion correcting unit 72 next determines whether distortion correction has been performed on all the local regions (step S46).

If the determination result of step S46 illustrates that not all the local regions have been processed, the procedure of step S44 is again carried out. If the determination result of step S46 illustrates that all the local regions have been processed, the distortion correcting unit 72 re-forms the image (step S47).

After that, the partial image output determining unit 50 determines whether all the partial images have been processed (step S48). If the determination result of step S48 illustrates that all the partial images have been processed, the operation described in the flowchart comes to an end. If the determination result of step S48 illustrates that not all the partial images have been processed, the procedures starting from step S41 are repeated.

According to this flowchart, correction can be performed on geometric distortions caused by the delay characteristics of the image capturing unit 10. Accordingly, excess discarding can be prevented in cases where overlapping partial images having a small relative movement amount in between are not regarded as overlapping images. Thus, information loss can be made smaller.

Also, by estimating the relative positions of local regions, the processing time required for local processing can be made shorter. More specifically, the area in which overlapping regions are searched for before relative positions are detected can be restricted to a smaller area. Accordingly, the time required for detecting relative positions can be made shorter.

[Fourth Embodiment]

Figure 14:
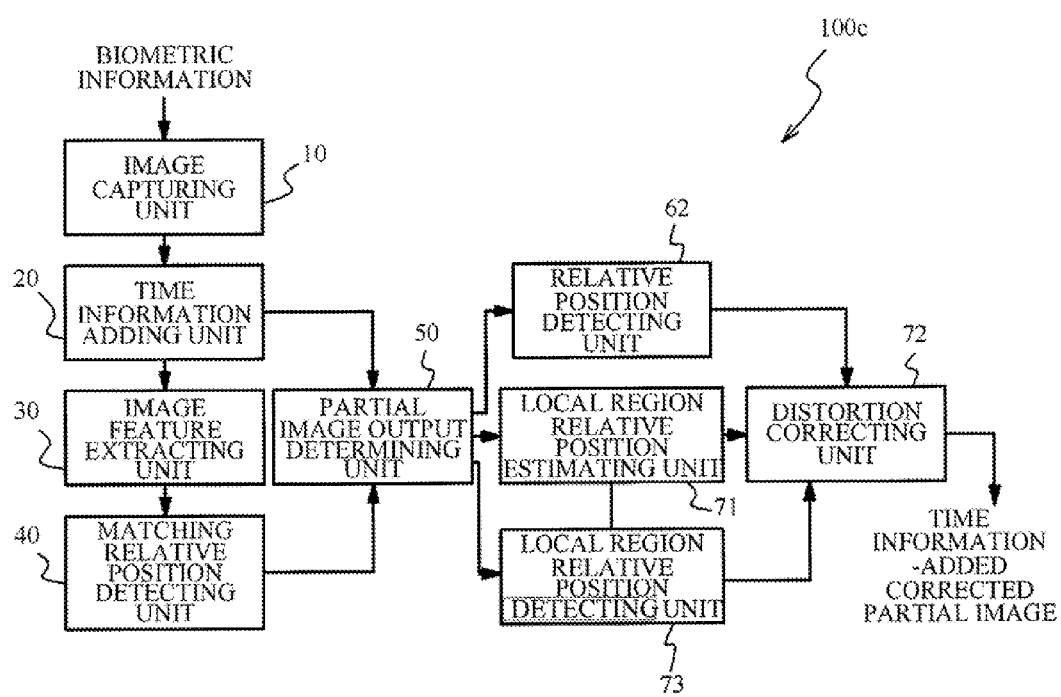
FIG. 14 is a block diagram illustrating the functional structure of a biometric information reading device in accordance with a fourth embodiment of the present invention.

FIG. 14 is a block diagram illustrating the functional structure of a biometric information reading device 100c in accordance with a fourth embodiment of the present invention. The biometric information reading device 100c differs from the biometric information reading device 100b depicted in FIG. 12, in further including a local region relative position detecting unit 73. The CPU executes a biometric information reading program for implementing a biometric information reading method in accordance with the fourth embodiment, so as to realize the local region relative position detecting unit 73. The local region relative position detecting unit 73 may be realized by special-purpose hardware or a computer.

The local region relative position detecting unit 73 detects a local region relative position from a distortion-corrected local region, based on a relative position estimated by the local region relative position estimating unit 71 and the time information added to the local region.

Figure 15:
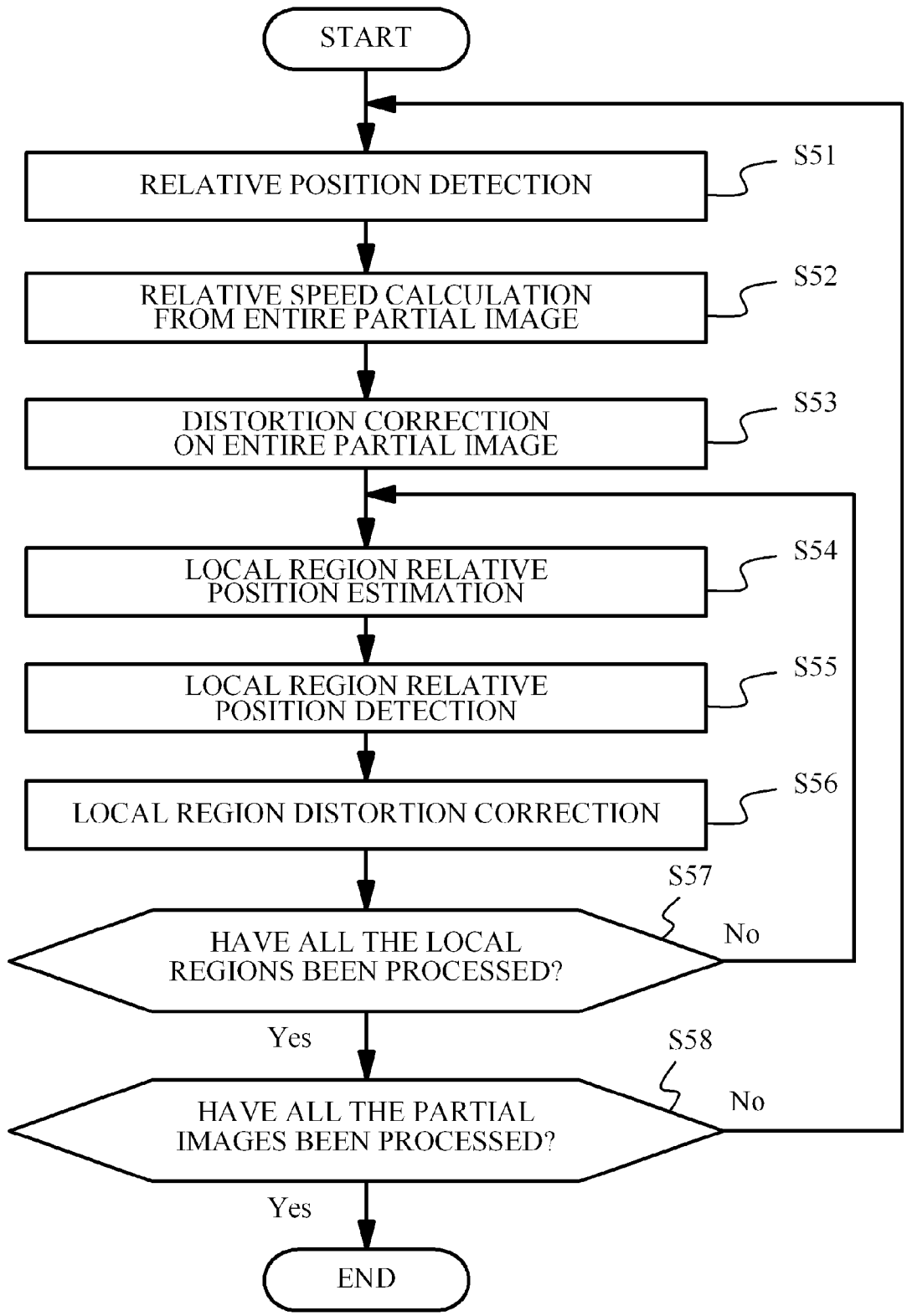
FIG. 15 is a flowchart illustrating an example of the operation to be performed in a case where the distortion amounts in local regions are corrected.

FIG. 15 is a flowchart illustrating an example of the operation to be performed in a case where distortion amounts in local regions are corrected. As depicted in FIG. 15, the relative position detecting unit 62 detects the relative position of a partial image (step S51). The relative position detecting unit 62 next calculates the relative speed from the entire partial image (step S52). The distortion correcting unit 72 then performs distortion correction on the entire partial image (step S53).

The local region relative position estimating unit 71 then estimates the relative position of a local region (step S54). The local region relative position detecting unit 73 detects the relative position of the local region, based on a distortion-corrected local region (step S55). The distortion correcting unit 72 then corrects the distortion of the local region (step S56). The distortion correcting unit 72 next determines whether distortion correction has been performed on all the local regions (step S57).

If the determination result of step S57 illustrates that not all the local regions have been processed, the procedure of step S54 is again carried out. If the determination result of step S57 illustrates that all the local regions have been processed, the partial image output determining unit 50 determines whether all the partial images have been processed (step S58). If the determination result of step S58 illustrates that all the partial images have been processed, the operation described in the flowchart comes to an end. If the determination result of step S58 illustrates that not all the partial images have been processed, the procedures starting from step S51 are repeated.

[Fifth Embodiment]

Figure 16:
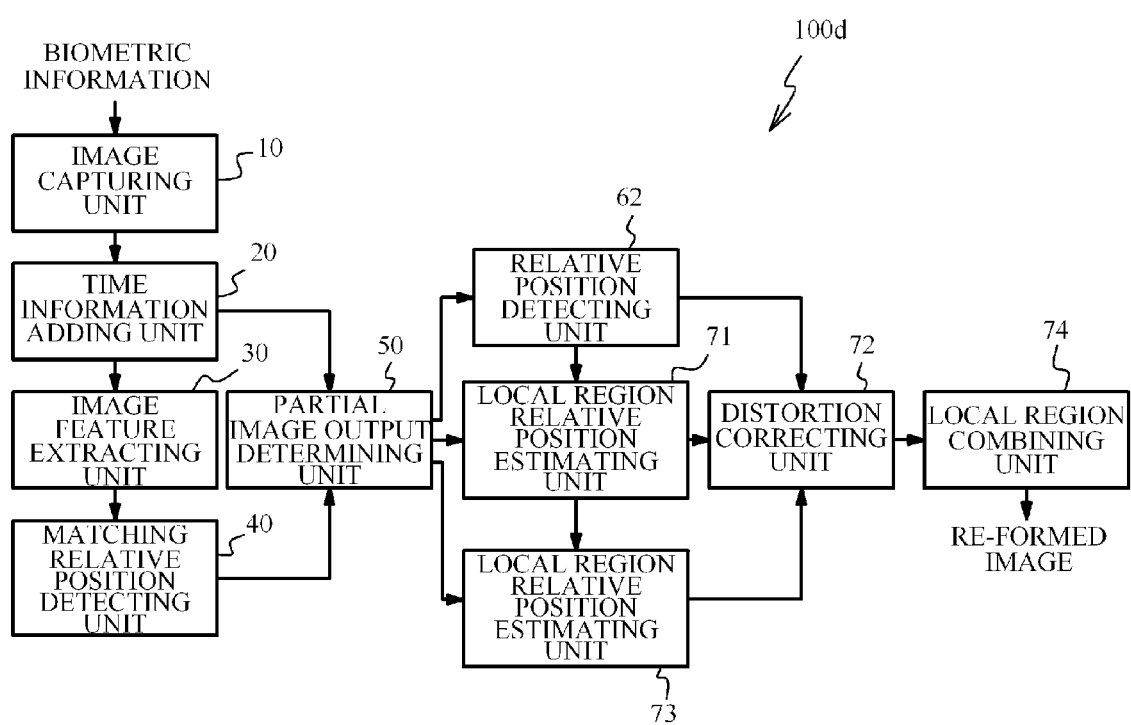
FIG. 16 is a block diagram illustrating the functional structure of a biometric information reading device in accordance with a fifth embodiment of the present invention.

FIG. 16 is a block diagram illustrating the functional structure of a biometric information reading device 100d in accordance with a fifth embodiment of the present invention. The biometric information reading device 100d differs from the biometric information reading device 100c depicted in FIG. 14, in further including a local region combining unit 74. The CPU executes a biometric information reading program for implementing a biometric information reading method in accordance with the fifth embodiment, so as to realize the local region combining unit 74. The local region combining unit 74 may be realized by special-purpose hardware or a computer.

The local region combining unit 74 combines overlapping local regions of two or more partial images into an image with the use of local regions having distortions corrected, based on the local region relative positions detected by the local region relative position detecting unit 73 and the time information allotted to the local regions.

By detecting the relative positions of all the partial images, it is possible to calculate the size of the entire re-formed image. More specifically, the relative positions of all the partial images satisfying the requirements are added to the reference position. The difference between the smallest value and the largest value among them is the size of the entire re-formed image. In the initialization of the re-formed image, the memory region storing the re-formed image is obtained from the difference between the smallest value and the largest value, and is filled with the initial value. The initial value represents the background color of the partial images. The background color is represented by a value observed when any biometric information is not detected. For example, in a biometric information capturing unit that is designed to generate "0" when any biometric information is detected, the re-formed image is filled with "0". In a biometric information capturing unit that is designed to generate "255" as the background color, the re-formed image is filled with "255".

When a partial image and a re-formed image are combined, the relative position of the partial image with respect to the re-formed image is calculated, and the re-formed image is combined with the partial image. In the combining operation, the re-formed image is updated with the use of the average value or a weighted average value among the overlapping pixels of the re-formed image and the partial image. More specifically, where $R(x, y)$ represents the re-formed image and $P_n(x, y)$ represents a partial image in the coordinates $(x_i, y_i)$, and $(\Delta x, \Delta y)$ represents the positional relationship between the re-formed image and the partial image, the pixels of the re-formed image are updated in the following manner:

$$R_n(x+\Delta x, y+n\Delta y) = c_0 \cdot R_{n-1}(x+\Delta x, y+\Delta y) + c_1 \cdot P_n(x, y)$$

$$c_0 + c_1 = 1$$

If $c_0$ is 0.5, and $c_1$ is 0.5, the average value can be readily obtained. In a case where the re-formed image is combined with partial images in the input order while the living subject gradually changes while being read, $c_0$ should be smaller than $c_1$, so that the difference between the re-formed image and a later input partial image becomes smaller.

Where the positional relationship between $P_k$ and $P_{k-1}$ is represented by $(\Delta x_k, \Delta y_k)$, the following equations are satisfied:

$$\Delta x = \Sigma \Delta x_k$$

$$\Delta y = \Sigma \Delta y_k$$

It is convenient for calculation purposes, if the re-formed image is expressed with the coordinates (0, 0) being the reference coordinates. Where n represents the number of partial images, the following equations are satisfied:

$$\Delta x = \Sigma \Delta x_k - \min(\Sigma \Delta x_n)$$

$$\Delta y = \Sigma \Delta y_k - \min(\Sigma \Delta y_n)$$

Here, $\min(\Sigma \Delta x_n)$ and $\min(\Sigma \Delta y_n)$ represent the above described reference position and the smallest value among the values having the relative positions added thereto.

Figure 17:
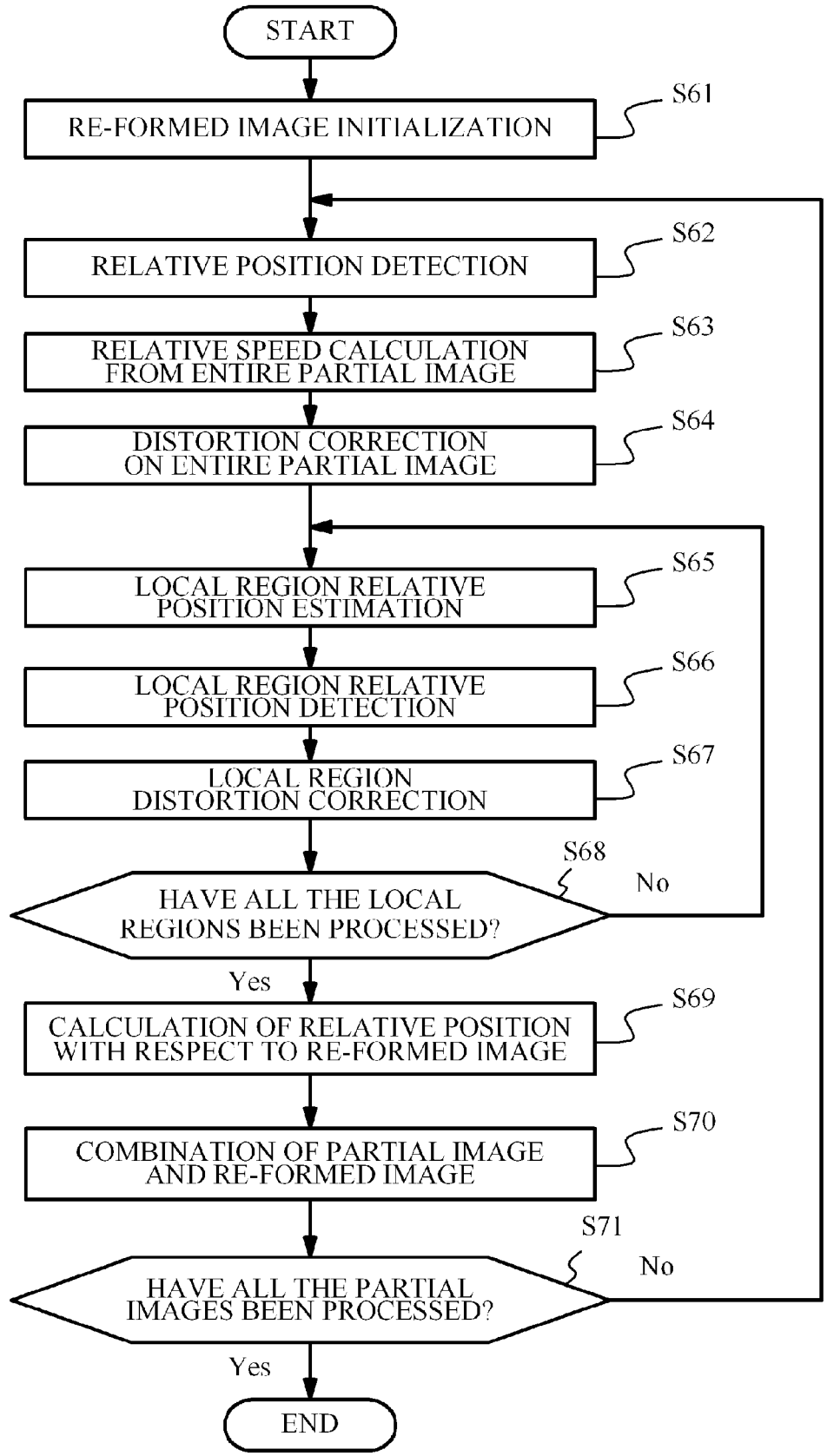
FIG. 17 is a flowchart illustrating an example of the operation to be performed in a case where the relative positions of the partial images are calculated and the distortion amounts in local regions are corrected while the re-formed image is updated.

FIG. 17 is a flowchart illustrating an example of the operation to be performed in a case where the relative positions of partial images are calculated and distortions are corrected while the re-formed image is updated. As depicted in FIG. 17, the local region combining unit 74 initializes a re-formed image (step S61). The relative position detecting unit 62 detects the relative position of a partial image (step S62). The relative position detecting unit 62 next calculates the relative speed from the entire partial image (step S63). The distortion correcting unit 72 then performs distortion correction on the entire partial image (step S64).

The local region relative position estimating unit 71 then estimates the relative position of a local region (step S65). The local region relative position detecting unit 73 detects the relative position of the local region, based on a distortion-corrected local region (step S66). The distortion correcting unit 72 then corrects the distortion of the local region (step S67). The distortion correcting unit 72 next determines whether distortion correction has been performed on all the local regions (step S68).

If the determination result of step S68 illustrates that not all the local regions have been processed, the procedure of step S65 is again carried out. If the determination result of step S68 illustrates that all the local regions have been processed, relative position detecting unit 62 calculates the relative position of the re-formed image with respect to the original image (step S69). The local region combining unit 74 then combines the partial image and the re-formed image (step S70).

The partial image output determining unit 50 then determines whether all the partial images have been processed (step S71). If the determination result of step S71 illustrates that all the partial images have been processed, the operation described in the flowchart comes to an end. If the determination result of step S71 illustrates that not all the partial images have been processed, the procedures starting from step S62 are repeated.

According to this flowchart, partial images on which processing has been performed become disposable. Accordingly, this embodiment is particularly effective in a case where the memory does not have the capacity to store all the partial images and re-formed images.

Figure 18:
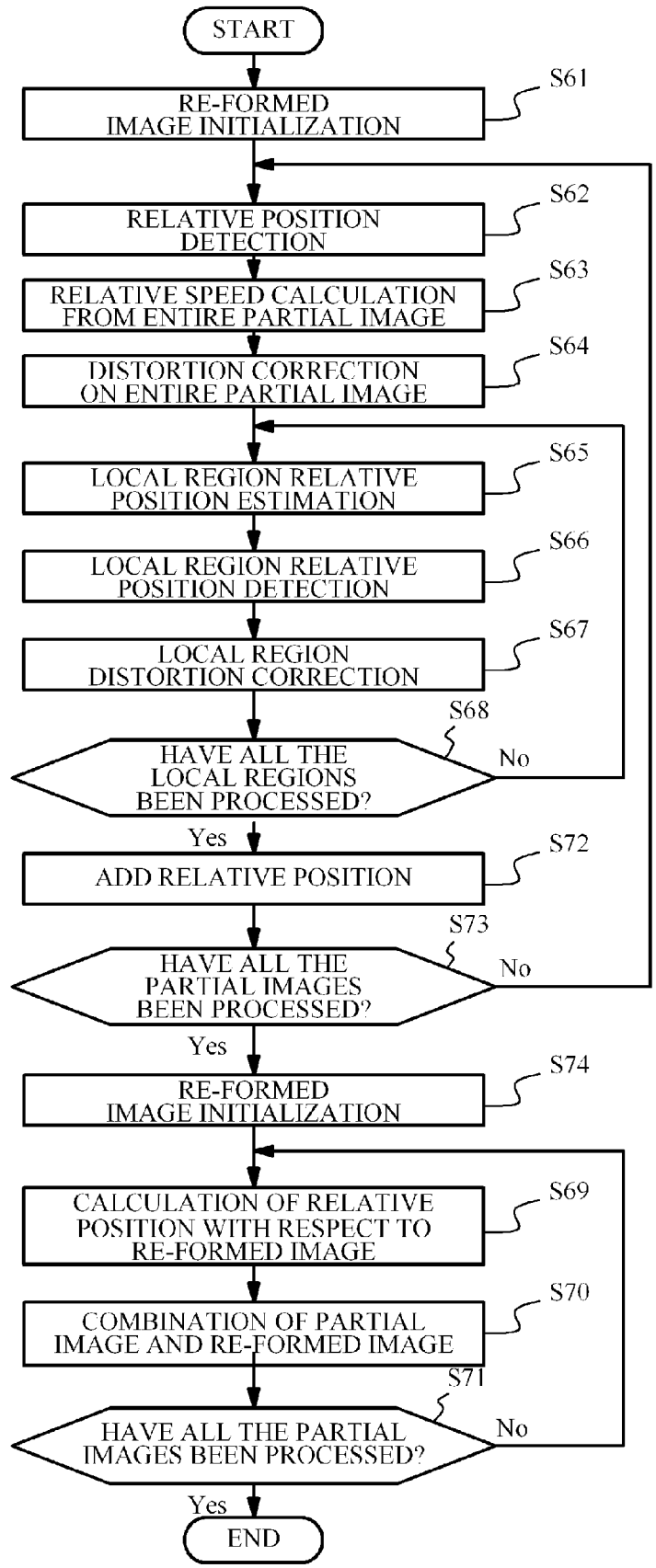
FIG. 18 is a flowchart illustrating an example of the operation to be performed in a case where relative position calculation and distortion correction are performed on all partial images, and the re-formed image is then updated.

FIG. 18 is a flowchart illustrating an example of the operation to be performed in a case where the re-formed image is updated after relative positions are calculated from all partial images and distortion correction is performed. The flowchart of FIG. 18 differs from the flowchart of FIG. 17 in that steps S72 through S74 are inserted between step S68 and step S69.

If the determination result of step S68 illustrates that all the local regions have been processed, the relative position detecting unit 62 adds the relative positions of all the partial images to the reference position (step S72). The relative position detecting unit 62 then determines whether all the partial images have been processed (step S73). If the determination result of step S73 illustrates that not all the partial images have been processed, the procedures starting from step S62 are repeated. If the determination result of step S73 illustrates that all the partial images have been processed, the local region combining unit 74 initializes the re-formed image (step S74). After that, the procedure of step S69 is carried out.

[Sixth Embodiment]

Figure 19:
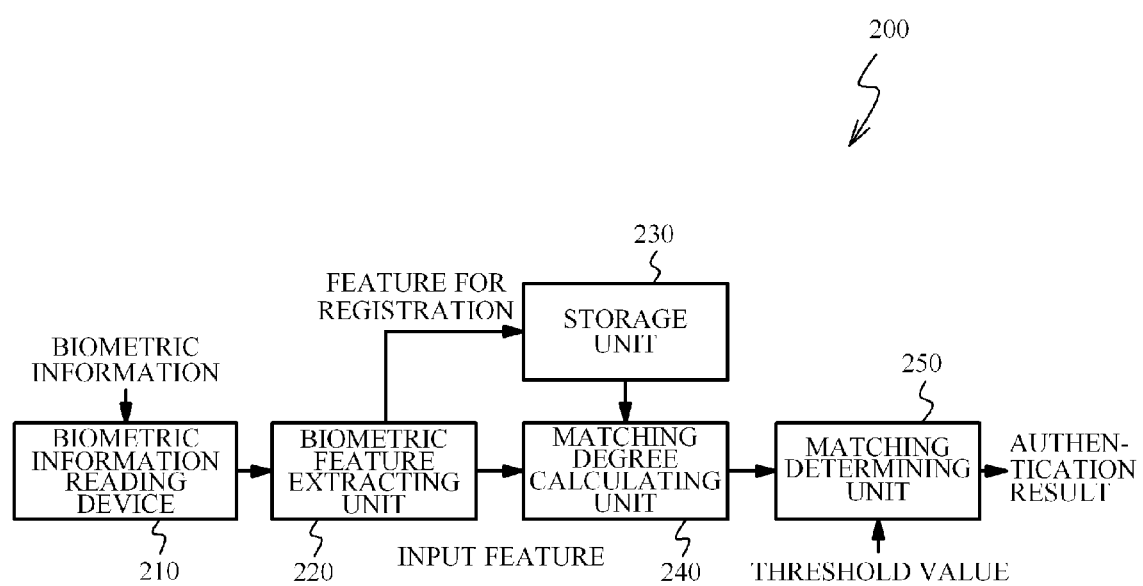
FIG. 19 is a block diagram illustrating the functional structure of a biometric authentication system in accordance with a sixth embodiment of the present invention.

FIG. 19 is a block diagram illustrating the functional structure of a biometric authentication system in accordance with a sixth embodiment of the present invention. As depicted in FIG. 19, the biometric authentication system 200 includes a biometric information reading device 210, a biometric feature extracting unit 220, a storage unit 230, a matching degree calculating unit 240, and the matching determining unit 250. The biometric information reading device 210 is the biometric information reading device 100d in accordance with the fifth embodiment.

The biometric authentication system 200 has a CPU. The CPU executes a biometric authentication program for implementing a biometric authentication method, so as to realize the biometric feature extracting unit 220, the matching degree calculating unit 240, and the matching determining unit 250. Each of the biometric feature extracting unit 220, the matching degree calculating unit 240, and the matching determining unit 250 may be realized by special-purpose hardware or a computer.

The biometric feature extracting unit 220 extracts the features of biometric information for registration or reference from the combined biometric information formed by the local region combining unit 74. The storage unit 230 is formed with a volatile memory and/or a nonvolatile memory. The storage unit 230 stores features to be registered, including identifiers added to the portions of living subjects or to the living subjects having the biometric information read by the biometric information reading device 210, and the features extracted by the biometric feature extracting unit 220, with the identifiers being associated with the features.

The matching degree calculating unit 240 calculates the matching degrees between the features for registration stored in the storage unit 230 and the features extracted for reference by the biometric feature extracting unit 220. If the matching degrees calculated by the matching degree calculating unit 240 are equal to or higher than a predetermined threshold value, the matching determining unit 250 determines that the features for reference correspond to the features for registration. The matching determining unit 250 further outputs the identifier associated with the feature for registration having the highest matching degree among the matching degrees calculated by the matching degree calculating unit 240, with respect to each of the extracted biometric features.

Figure 20:
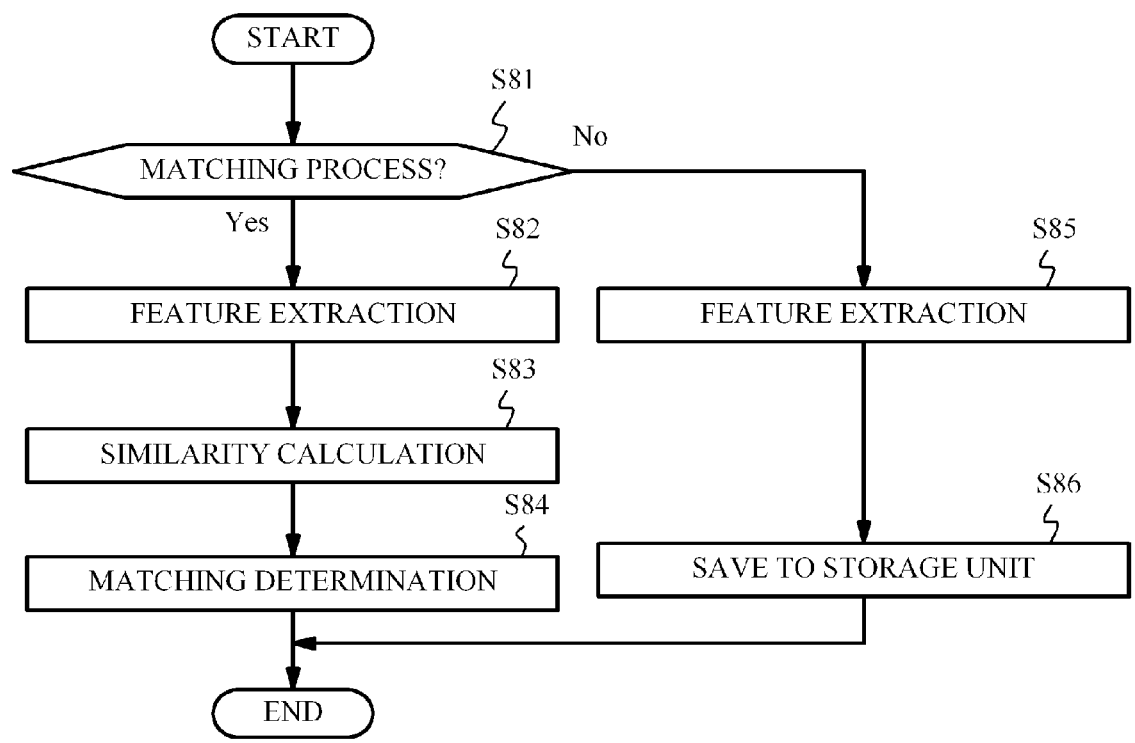
FIG. 20 is a flowchart illustrating an example of the operation to be performed at the time of personal authentication.

FIG. 20 is a flowchart illustrating an example of the operation to be performed at the time of personal authentication. The operation described in the flowchart of FIG. 20 is performed when all the partial images are determined to have been processed in step S71 of the flowchart of FIG. 18.

First, a determining unit not depicted in FIG. 19 determines whether the operation is a process of matching (step S81). If the operation is determined not to be a process of matching in step S81, the biometric feature extracting unit 220 extracts biometric features for registration (step S84). The storage unit 230 then stores the biometric features extracted in step S83 as features for registration (step S85). The operation described in the flowchart then comes to an end.

If the operation is determined to be a process of matching in step S81, the biometric feature extracting unit 220 extracts biometric features for reference (step S82). The matching degree calculating unit 240 then calculates the matching degrees (step S83). The matching determining unit 250 then performs a matching determination. The operation described in the flowchart then comes to an end.

In accordance with this embodiment, adverse influence of distortions caused by changes in the relative positions at the time of biometric information input can be eliminated. In this case, the reproducibility of the matching degrees calculated from the features for reference and the features for registration extracted from input biometric information can be made higher. Accordingly, the matching degrees calculated from the same biometric information can be maintained at high values. Thus, it is possible to lower the frequency at which the person is not authenticated when the matching degrees are lower than the threshold value decided for matching determinations. Furthermore, the usability of personal authentication using biometric information can be made higher. At the same time, the matching degrees calculated from different sets of biometric information can be maintained at low values. Accordingly, it is possible to lower the frequency at which a third party is authenticated when the matching degrees are higher than the threshold value defined for matching determinations. Also, the reliability of the personal authentication using biometric information can be increased.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:
1. A biometric information reading device comprising:
a memory; and
a processor configured to execute a procedure comprising:
successively capturing a plurality of partial images containing biometric information of a user by an image capture device that captures an image of a biometric body of the user;

storing a predetermined number of successive partial images captured by the image capture device in the memory, the predetermined number being two or more, extracting an image feature from each of partial images and a position of the image feature;

determining whether a difference between relative positions of two successive partial images among the partial images is equal to or smaller than a threshold value, based on image features of overlapping regions between the two successive partial images;

determining to output the successive partial images stored in the memory as a first set without calculating a difference between relative positions of partial images included in the first set;

determining not to output a partial image that is captured after the first set when it is determined that a difference between a relative position of the partial image and a relative position of one of the partial images included in the first set is equal to or smaller than the threshold; and determining to output at least two successive partial images as a second set including a partial image that is captured after the first set without calculating a difference between relative positions of partial images included in the second set when it is determined that a difference between a relative position of the partial image and a relative position of one of the partial images included in the first set is not equal to or smaller than the threshold.

2. The biometric information reading device as claimed in claim 1, wherein the procedure further comprises setting an upper limit on a number of partial images that are already captured by the image capture device and are determined to thin out.

3. The biometric information reading device as claimed in claim 1, wherein the procedure further comprises adding time information to each partial image, wherein the time information includes a reading start time at which the image capture device starts reading partial images, and includes a reading end time or a reading time elapsed between a reading start time and a reading end time in a case where there is a delay caused between the reading start time and the reading end time due to characteristics of the image capture device that reads the partial images.

4. The biometric information reading device as claimed in claim 3, wherein the procedure further comprises:

detecting a relative distance between two or more partial images among captured partial images, based on an image feature of an overlapping region between the two or more partial images; and calculating a distortion amount of a geometric distortion caused by scanning the captured partial images, based on a relative movement speed determined from the time information and the relative distance, wherein it is determined to store the partial image after the first set and at least one or more partial images in the memory when the distortion amount is larger than a threshold value.

5. The biometric information reading device as claimed in claim 3, wherein the procedure further comprises:

detecting a relative distance between two or more partial images among captured partial images, based on an image feature of an overlapping region between the two or more partial images; and correcting a geometric distortion caused by scanning of partial images by the image capture device, based on a relative movement speed determined from the time information and the relative distance, a skew distortion being corrected with use of a main-scanning directional component of a movement direction of a living subject, an expansion or contraction distortion being corrected with use of a sub-scanning directional component of the movement direction of the living subject.

6. The biometric information reading device as claimed in claim 5, wherein a distortion of each of local regions that are formed in conformity with scanning lines of the partial images captured by the image capture device is corrected in the correcting of the geometrid distortion.

7. The biometric information reading device as claimed in claim 6, wherein the procedure further comprises:

estimating a relative position of each of the local regions, with use of a relative position calculated from an entire partial image in the detecting of the relative distance and relative positions of adjacent local regions having successive reading times.

8. The biometric information reading device as claimed in claim 7, wherein the procedure further comprises:

detecting a local region relative position with use of a distortion-corrected local region, based on the local region estimated relative position estimated in the estimating of the relative region, and local region time information calculated with use of a reading start time or a reading end time of the location region calculated based on the time information added to the local region in the adding of the time information.

9. The biometric information reading device as claimed in claim 8, wherein the procedure further comprises:

synthesizing an image at a location where the local regions of the two or more partial images overlap with each other with use of a distortion-corrected local region having a distortion corrected, based on the local region relative position detected in the detecting of the local region relative position and the local region time information.

10. The biometric information reading device as claimed in claim 9, wherein the procedure further comprises:

extracting a biometric information feature from the synthetic biometric information synthesized in the synthesizing of the image;

wherein the biometric information reading device further comprises a storage unit that stores biometric information feature extracted for registration in the extracting of the biometric information feature, and associates the biometric information with an identifier;

wherein the procedure comprises:

detecting a matching degree between the feature for registration stored in the storage unit and a living subject feature extracted for reference in the extracting of the biometric information feature; and determining that the feature for reference is associated with the feature for registration, when the matching degree detected in the detecting of the matching degree is equal to or greater than a threshold value.

11. The biometric information reading device as claimed in claim 1, wherein the identifier associated with a feature for registration having a matching degree equal to or greater than the threshold value and having the highest matching degree among at least two matching degrees detected in the detecting of the matching degree with respect to the respective features for registration is output, based on a plurality of features for registration stored in the storage unit and biometric information extracted for identification in the extracting of the biometric information feature.

12. A biometric information reading method comprising:
- successively capturing a plurality of partial images containing biometric information of a user by an image capture device that captures an image of a biometric body of the user;
- storing a predetermined number of successive partial images captured by the image capture device in a memory, the predetermined number being two or more,
- extracting an image feature from each of the partial images and a position of the image feature;
- determining whether a difference between relative positions of two successive partial images among the partial images is equal to or smaller than a threshold value, based on image features of overlapping regions between the two successive partial images;
- determining to output the successive partial images stored in the memory as a first set without calculating a difference between relative positions of partial images included in the first set;
- determining not to output a partial image that is captured after the first set when it is determined that a difference between a relative position of the partial image and a relative position of one of the partial images included in the first set is equal to or smaller than the threshold; and
- determining to output at least two successive partial images as a second set including a partial image that is captured after the first set without calculating a difference between relative positions of partial images included in the second set when it is determined that a difference between a relative position of the partial image and a relative position of one of the partial images included in the first set is not equal to or smaller than the threshold.

13. The biometric information reading method as claimed in claim 12, further comprises setting an upper limit on a number of partial images that are already captured by the image capture device and are determined to thin out.

14. The biometric information reading method as claimed in claim 12, further comprising adding time information to each partial image,
- wherein the time information includes a reading start time at which the image capture device starts reading partial images, and includes a reading end time or a reading time elapsed between a reading start time and a reading end time in a case where there is a delay caused between the reading start time and the reading end time due to characteristics of the image capture device that reads the partial images.

15. The biometric information reading method as claimed in claim 12, further comprising:
- detecting a relative distance between two or more partial images among captured partial images, based on an image feature of an overlapping region between the two or more partial images; and
- calculating a distortion amount of a geometric distortion caused by scanning the captured partial images, based on a relative movement speed determined from the time information and the relative distance,
- wherein it is determined to store the partial image after the first set and at least one or more partial images in the memory when the distortion amount is larger than a threshold value.

* * * * *